United States Patent
Chao et al.

(10) Patent No.: US 7,778,120 B2
(45) Date of Patent: Aug. 17, 2010

(54) CALIBRATION METHOD FOR DETERMINING SERVO PARAMETERS FOR ACCESSING AN OPTICAL DISC

(75) Inventors: Chi-Mou Chao, Hsinchu County (TW); Yu-Chun Lin, Hsin-Chu (TW)

(73) Assignee: Mediatek Inc., Science-Based Industrial Park, Hsin-Chu (TW)

( * ) Notice: Subject to any disclaimer, the term of this patent is extended or adjusted under 35 U.S.C. 154(b) by 491 days.

(21) Appl. No.: 11/745,466

(22) Filed: May 8, 2007

(65) Prior Publication Data

US 2008/0279056 A1    Nov. 13, 2008

(51) Int. Cl.
G11B 7/00    (2006.01)

(52) U.S. Cl. .............. 369/44.29; 369/47.53; 369/53.28; 369/53.31; 369/53.34

(58) Field of Classification Search .............. 369/44.29, 369/47.53, 53.28, 53.31, 53.34
See application file for complete search history.

(56) References Cited

U.S. PATENT DOCUMENTS

| | | | | |
|---|---|---|---|---|
| 5,504,726 A | * | 4/1996 | Semba | 369/44.28 |
| 5,610,886 A | | 3/1997 | Hayashi | |
| 5,617,401 A | * | 4/1997 | Hurst, Jr. | 369/47.52 |
| 5,677,809 A | * | 10/1997 | Kadlec | 360/78.09 |
| 5,978,335 A | * | 11/1999 | Clark et al. | 369/53.34 |
| 6,556,524 B1 | * | 4/2003 | Takeshita | 369/47.43 |
| 6,963,525 B2 | * | 11/2005 | Honda | 369/47.53 |
| 7,023,766 B2 | * | 4/2006 | Kadlec et al. | 369/44.29 |
| 2004/0066716 A1 | * | 4/2004 | Yu | 369/44.29 |
| 2004/0145978 A1 | | 7/2004 | Yamamoto | |
| 2004/0218496 A1 | * | 11/2004 | Sekiya | 369/53.22 |
| 2005/0018559 A1 | | 1/2005 | Chen | |
| 2005/0025018 A1 | * | 2/2005 | Hsu et al. | 369/53.26 |
| 2006/0083135 A1 | * | 4/2006 | Minemura | 369/47.51 |
| 2006/0233075 A1 | * | 10/2006 | Yeh et al. | 369/47.53 |
| 2007/0274172 A1 | * | 11/2007 | Oda et al. | 369/44.27 |
| 2008/0117754 A1 | * | 5/2008 | Yu | 369/47.53 |
| 2009/0268572 A1 | * | 10/2009 | Van Endert | 369/47.53 |
| 2009/0316544 A1 | * | 12/2009 | Van Endert | 369/47.53 |

FOREIGN PATENT DOCUMENTS

| | | |
|---|---|---|
| JP | 200242344 A | 2/2002 |
| JP | 2002298396 | 10/2002 |
| JP | 2004234812 | 8/2004 |
| JP | 200699903 | 4/2006 |

\* cited by examiner

*Primary Examiner*—Wayne R Young
*Assistant Examiner*—Brenda Bernardi
(74) *Attorney, Agent, or Firm*—Winston Hsu

(57) ABSTRACT

Calibration methods are provided for determining servo parameters to enhance an optical drive in reading and writing a blank optical disc. First, test data is written on the blank disc with various writing parameters. Second, the written test data is read from the optical disc with various reading parameters. A plurality of quality measures are obtained, each corresponds to a specific combination of the writing parameter and the reading parameter. An optimal writing parameter and an optimal reading parameter are determined by comparing the quality measures with respect to both the reading and writing parameters respectively.

11 Claims, 7 Drawing Sheets

| Groove | | e4 | ec | fc | fc | 04 | 0c | 14 | lc | Average |
|---|---|---|---|---|---|---|---|---|---|---|
| | e4 | 26 | 17 | 14 | 11 | 23 | 56 | 145 | 145 | 55 |
| | e8 | 12 | 6 | 18 | 9 | 15 | 60 | 171 | 171 | 56 |
| | ec | 29 | 9 | 5 | 13 | 17 | 58 | 164 | 164 | 58 |
| | f0 | 19 | 8 | 6 | 3 | 11 | 52 | 174 | 174 | 56 |
| | f4 | 11 | 5 | 4 | 5 | 10 | 36 | 156 | 156 | 48 |
| | f8 | 6 | 4 | 1 | 1 | 6 | 33 | 101 | 101 | 32 |
| | fc | 2 | 1 | 0 | 1 | 2 | 17 | 113 | 113 | 31 |
| | 00 | 5 | 2 | 1 | 2 | 6 | 18 | 115 | 115 | 33 |
| | 04 | 9 | 6 | 2 | 11 | 6 | 41 | 186 | 186 | 55 |
| | 08 | 13 | 5 | 6 | 4 | 15 | 54 | 179 | 179 | 58 |
| | 0c | 13 | 4 | 4 | 5 | 7 | 42 | 166 | 166 | 51 |
| | 10 | 11 | 5 | 3 | 22 | 13 | 79 | 191 | 191 | 62 |
| | 14 | 33 | 14 | 14 | 70 | 53 | 132 | 195 | 195 | 82 |
| | 18 | 73 | 54 | 50 | 149 | 103 | 183 | 192 | 192 | 115 |
| | lc | 153 | 130 | 126 | 19 | 171 | 184 | 194 | 194 | 163 |
| | Average | 26 | 17 | 15 | 19 | 29 | 65 | 153 | 153 | |

| LAND | Read focus error offset / bias | | | | | | | | |
|---|---|---|---|---|---|---|---|---|---|
| | e4 | ec | f4 | fc | 04 | 0c | 14 | 1c | Average |
| Write focus error offset / bias — e4 | 178 | 135 | 123 | 108 | 105 | 127 | 149 | 182 | 138 |
| e8 | 161 | 99 | 75 | 51 | 50 | 70 | 96 | 189 | 99 |
| ec | 93 | 37 | 24 | 21 | 20 | 33 | 43 | 152 | 53 |
| f0 | 47 | 10 | 8 | 8 | 9 | 7 | 25 | 100 | 27 |
| f4 | 67 | 22 | 16 | 9 | 9 | 13 | 29 | 113 | 35 |
| f8 | 56 | 19 | 6 | 5 | 7 | 9 | 22 | 118 | 30 |
| fc | 44 | 9 | 5 | 0 | 1 | 2 | 12 | 62 | 17 |
| 00 | 30 | 7 | 5 | 5 | 1 | 1 | 9 | 72 | 16 |
| 04 | 27 | 3 | 5 | 1 | 6 | 2 | 7 | 64 | 14 |
| 08 | 52 | 20 | 14 | 7 | 12 | 10 | 19 | 89 | 27 |
| 0c | 58 | 14 | 18 | 11 | 5 | 12 | 14 | 61 | 25 |
| 10 | 49 | 9 | 8 | 9 | 4 | 9 | 11 | 58 | 20 |
| 14 | 29 | 17 | 7 | 7 | 4 | 12 | 19 | 63 | 20 |
| 18 | 138 | 104 | 72 | 67 | 63 | 69 | 97 | 185 | 99 |
| 1c | 189 | 158 | 143 | 138 | 142 | 140 | 169 | 194 | 159 |
| Average | 76 | 41 | 33 | 28 | 27 | 32 | 45 | 106 | |

CALIBRATION METHOD FOR DETERMINING SERVO PARAMETERS FOR ACCESSING AN OPTICAL DISC

BACKGROUND OF THE INVENTION

1. Field of the Invention

The present invention relates to calibration methods of determining servo parameters for reading and writing an optical disc, and more particularly, to calibration methods capable of determining optimal servo parameters for a blank optical disc.

2. Description of the Prior Art

A rewritable drive is popularly used for backing up important data. Precise writing and reading data on the optical disc by the rewritable drive secures the accuracy of the data stored in the optical disc.

Please refer to FIG. 1, which is a block diagram of a servo system 100 in a rewritable drive, for illustrating how a writing procedure and a reading procedure are performed by the rewritable drive. As shown in FIG. 1, an optical disc 101 is loaded and rotated by a spindle 103.

In the reading procedure, an optical pickup unit (OPU) 102 is utilized for reading data stored on the optical disc 101. A radio frequency (RF) unit 104 receives and processes RF signals read from the optical disc 101, and a read channel 105 converts output signals of the RF unit 104 from analog to digital. A decoder 106 decodes the digital signals outputted from the read channel 105 into plain data, and it is capable of generating one or more data quality indexes, for example, PI (Parity Inner) error rate, jitter value, beta value, and $M_{14}$ parameter.

$M_{14}$ parameter represents a reflection difference between a 14T pit and a 14T land, and therefore, $M_{14}$ is the maximum amplitude of the RF signal. This parameter $M_{14}$ can be used to determine an optimal write power by referencing a characteristic curve of a reflection difference $M_{14}$ versus a recording power.

In the writing and reading procedures, it is desirable to maintain a low PI error rate, a low jitter value, and a large $M_{14}$ parameter. For the beta value, it is desirable to keep the beta value as close to the target beta value as possible.

In the writing procedure, plain data is first encoded by an encoder 109. A write strategy generator 108 calculates and generates adequate writing pulses based on the data encoded by the encoder 109, and a laser driver (LD) 107 emits laser beam onto the optical disc 101. The tracking error (TE) and focusing error (FE) generated by the RF unit 104 are sent to a digital signal processor (DSP) 111 for calculating a control force for a power driver 110. The power driver 110 controls the movement of the OPU 102 by a focus control signal and a track control signal, and the power driver 110 also generates a spindle control signal for the spindle 103.

However, if the rewritable drive reads a blank optical disc, due to the absence of data for calibrating the reading parameter (such as a read focusing error (FE) offset/bias or a read tracking error (TE) offset/bias), the rewritable drive may utilize an improper reading parameter to perform write servo signal calibration and optimum power calibration (OPC), where the fact results in acquiring an improper writing parameter or an improper writing power. The improper writing parameter or the improper writing power increases the bit error rate, and thus degrades the recording quality.

Note that the write/read FE offset indicates a focus location of a focus servo in writing/reading, the write/read TE offset indicates a track location of a tracking servo in writing/reading, the write/read FE bias indicates a bias added on a focus servo control force in writing/reading, and the write/read TE bias indicates a bias added on a tracking servo control force in writing/reading.

SUMMARY OF THE INVENTION

Methods of calibrating servo parameters for accessing an optical disc are provided. An embodiment of the calibration methods comprises changing the value of a writing parameter from a first writing parameter to a second writing parameter while writing data on the optical disc, reading the data from the optical disc with a first reading parameter and a second reading parameter, acquiring a quality measure corresponding to each combination of the reading parameters and the writing parameters, and selecting an optimal reading parameter and an optimal writing parameter for accessing the optical disc based on the quality measures. In some embodiments, the reading parameter is a tracking error (TE) offset bias or a focusing error (FE) offset bias, where the reading parameter is utilized while reading data from the optical disc. The writing parameter is a TE offset bias or a FE offset bias, where the writing parameter is utilized while writing data to the optical disc.

Another embodiment of the calibration methods comprises generating a matrix having a plurality of elements, where each element of the matrix is a quality measure found by writing to the optical disc and reading from the optical disc, each row of said matrix utilizing a different writing parameter, and each column of said matrix utilizing a different reading parameter. A row candidate value for each row of said matrix is calculated according to the elements in said row respectively, and a column candidate value for each column of said matrix is calculated according to the elements in said column respectively. One writing parameter is selected as a target writing parameter by comparing the row candidate values, and one reading parameter is selected as a target reading parameter by comparing the column candidate values.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a table of a two-dimensional matrix illustrating how to determine an optimal write FE offset/bias and an optimal read FE offset/bias when accessing groove tracks according to a first embodiment.

FIG. 5 is a table of a two-dimensional matrix illustrating how to determine an optimal write FE offset/bias and an optimal read FE offset/bias when accessing land tracks according to a second embodiment.

DETAILED DESCRIPTION

One of the objectives of the calibration methods of the present invention is to improve the accuracy of reading and writing parameters for accessing a blank disc. The present invention provides calibration methods of determining reading and writing parameters, such as a write focusing error (FE) offset/bias (also known as a focus balance), a read focusing error (FE) offset/bias, a write tracking error (TE) offset/bias (also known as a tracking center for RAM type disc), or a read tracking error (TE) offset/bias, for well manipulating servo control and power calibration of the servo system shown in FIG. 1.

FIG. 2 is table of a two-dimensional matrix 300 for illustrating how to determine an optimal write FE offset/bias and an optimal read FE offset/bias according to a first embodiment of the present invention while running groove tracks. A first dimension of the two-dimensional matrix 300 indicates different values of the write focus error offset/bias (or write focus balance WFB) 303, where each of the values is a candidate value, and one may be selected later as an optimal write focus error offset/bias 308. A second dimension of said two-dimensional matrix 300 indicates different values of the read focus error offset/bias (or read focus balance RFB) 301, where each of the values is also a candidate value, and one may be selected later as an optimal read focus error offset/bias 309. Each element 302 of the two-dimensional matrix 300 is a PI (inner parity) error rate corresponding to a write focus error offset bias and a read focus error offset bias.

Figure 1:
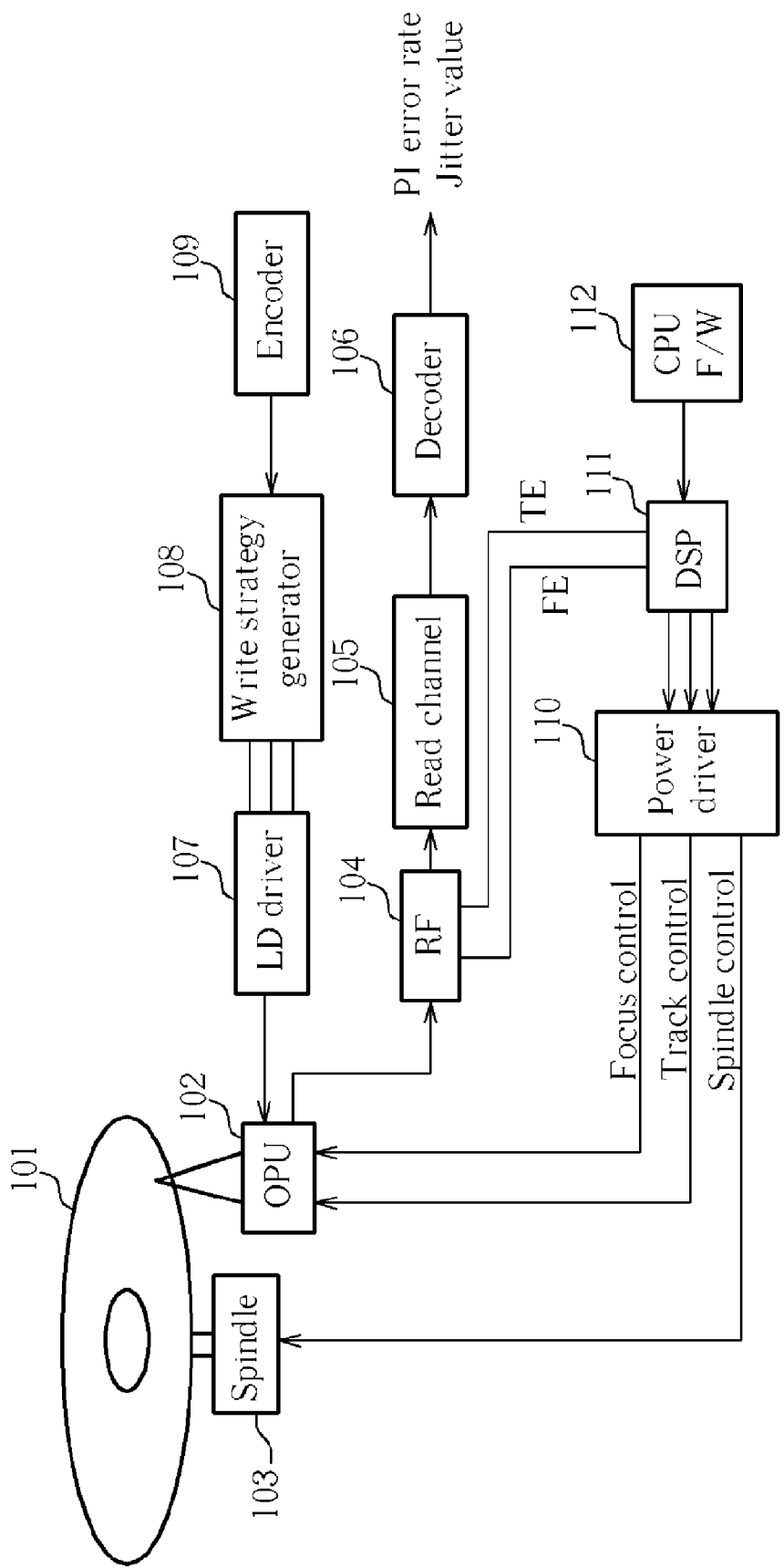
FIG. 1 is a block diagram of a servo system in a rewritable optical disc drive.

A procedure of generating the two-dimensional matrix 300 is described as follows. First, the servo system as shown in FIG. 1 performs a writing procedure on a power calibration area (PCA) of an optical disc, where the write focus error offset bias (WFB) 303 varies while writing test data on the PCA. For example, the value of the WFB 303 changes from 0xE4 to 0x1C as shown in FIG. 2. Second, the test data written on the PCA is read back several times with various read focus error offset bias (RFB) 301. For example, the value of the RFB 301 changes from 0xE4 to 0x1C as shown in FIG. 2. Note that the calibration methods of the present invention are not limited to writing test data on the PCA area. The test data is written with different WFB 303, thus PI error rates of the first column can be obtained by reading the test data with a RFB having the value 0xE4. PI error rates of the second column can be obtained by reading the test data with a RFB having the value OXEC, and so on. Each PI error rate 302 in the two-dimensional matrix 300 corresponds to a specific WFB 303 and a specific RFB 301. Please refer to FIG. 3, which is a three-dimensional graph illustrating a relationship between the WFB, RFB, and PI error rate.

In some other embodiments of the present invention, instead of acquiring the PI error rate corresponding to each combination of WFB and RFB, other quality measures, such as jitter value, beta value, or $M_{14}$ parameter, can also be used to determine optimal reading and writing parameters.

A procedure for determining an optimal RFB and an optimal WFB is described as follows, and is based on the established data in the table 300 shown in FIG. 2. While determining an optimal WFB, for each row shown in the two-dimensional matrix 300, i.e., for each WFB 303, a first average PI error rate 304 of each WFB is generated by averaging PI error rates 302 on the same row. A plurality of first average PI error rates 304 is generated with respect to each WFB 303. Each first average PI error rate 304 may be determined by calculating an arithmetic average, a geometric mean, or a median of the PI error rates 302 on the same row. After determining the first average PI error rate 304 for the WFB 303, a first target PI error rate 305, whose value is 31 as shown in FIG. 2, is determined as a smallest first average PI error rate 304 among all the first average PI error rates 304. The first target PI error rate 305 corresponds to a target WFB 308 (the smallest value 31 of the first target average PI error rate 305 corresponds to the WFB 303 of value 0xFC, which indicates a hexadecimal value of −4), which can be used as the optimal WFB, at least approximately. The target WFB 308 is utilized by the power driver 110 to control the write focus of the optical processing unit 102 for writing the optical disc 101.

Similarly, for each column shown in the two-dimensional matrix 300, a second average PI error rate 306 of each RFB is generated by averaging the PI error rates 302 on the same column. A plurality of second average PI error rates 306 is generated with respect to each RFB 301. Each second average PI error rate 306 may be determined by calculating an arithmetic average, a geometric mean, or a median of the PI error rates 302 on the same column. After determining the second average PI error rates 306 for each RFB 301, a second target PI error rate 307, whose value is 15 as shown in FIG. 2, is determined as a smallest first average PI error rate 306 among all the second average PI error rates 306. The second target PI error rate 307 corresponds to a target RFB 309 (the smallest value 15 of the second target average PI error rate 307 corresponds to the RFB 301 of value 0xF4, which indicates a hexadecimal representation of −12), which is the optimal RFB, at least approximately. The target RFB 309 is utilized by the power driver 110 to control the read focus of the optical processing unit 102 for reading the optical disc 101.

The abovementioned embodiment of calibration methods describes the procedures for determining read and write focusing error offsets/biases (or focus balance), however, the same procedures may be applied to determine read and write tracking error offsets/biases by changing the read and write tracking error offsets/biases to obtain a matrix containing quality measures corresponding to different read and write TE offsets/biases.

Note that during the abovementioned writing procedure tested on the optical disc, a preferred technique for applying the WFB 303 is writing the optical disc with different WFB 303 in sequence. Please refer to FIG. 4, which is a plot illustrating a method of applying different WFB 303 shown in FIG. 3 while writing the optical disc. As shown in FIG. 4, WLDON (Write LD-ON) indicates a state of whether the laser driver 107 is switched on, and when WLDON is high, the laser driver 107 writes data on the optical disc. During WLDON is high, the plurality of WFB 303 is applied in a descending order, as shown in FIG. 4.

Note that while a plurality of second average PI error rates 307 is generated during the reading procedure, it is possible for merely applying certain RFB 301 instead of applying all the RFB 301 shown in FIG. 2. For example, a binary-search-based order for applying said certain RFB 301 may be recursively utilized on all the RFB 301. In a preferred embodiment of the present invention, a median whose value is 0xFC or 0x04, i.e. −4 or 4 in decimal representation, a head whose value is 0xE4, which indicates 28 in decimal representation, and a tail whose value is 0x1C, which indicates 28 in decimal representation, of the RFB 301 as shown in FIG. 2, may first be utilized to calculate three corresponding second average PI error rates 306 for deriving a temporary smallest PI error rate 306. The method is then recursively executed until a global smallest average PI error rate is found. Therefore, only certain average PI error rates 306 of certain RFB 301 are required to be calculated, and a huge amount of computations is thus saved.

The binary-search-based technique may also be applied for determining the optimal WFB 308. While a plurality of first average PI error rates 304 is generated during the reading procedure, it is possible for merely applying certain WFB 303 instead of applying all the WFBs 303 shown in FIG. 2. In a preferred embodiment of the present invention, a median whose value is 0x00, which indicates 0 in decimal representation, a head whose value is 0xE4, which indicates −28 in decimal representation, and a tail whose value is 0x1C, which indicates 28 in decimal representation, of the WFB 303 as shown in FIG. 2, may first be utilized to calculate three corresponding first average PI error rates 304 for deriving a temporary smallest average PI error rate 304. The method is then recursively executed until a global smallest PI error rate is found. Therefore, only certain average PI error rates 304 of certain WFB 303 are required to be calculated, and a huge amount of computations is thus saved.

Note that the binary-search-based technique may be applied since the sequence of values of the first average PI error rate 304 includes a strictly decreasing subsequence and a strictly increasing subsequence corresponding to values of the WFB 303 in a strictly-increasing manner, where said strictly decreasing subsequence is followed by said strictly increasing sequence. The phenomenon may be obvious observed in FIG. 2. Similarly, since the sequence of values of the second average PI error rate 306 includes a strictly decreasing subsequence and a strictly increasing subsequence corresponding to values of the RFB 301 in a strictly-increasing manner, where said strictly decreasing subsequence is followed by said strictly increasing sequence, the binary-search-based technique may also be applied for generating a certain plurality of first average PI error rates 304. Besides, according to the same reason, a center of mass technique, a curve fitting method, or a body-centered technique may also be utilized for determining an optimal PI error rate from a plurality of average PI error rates.

Figure 6:
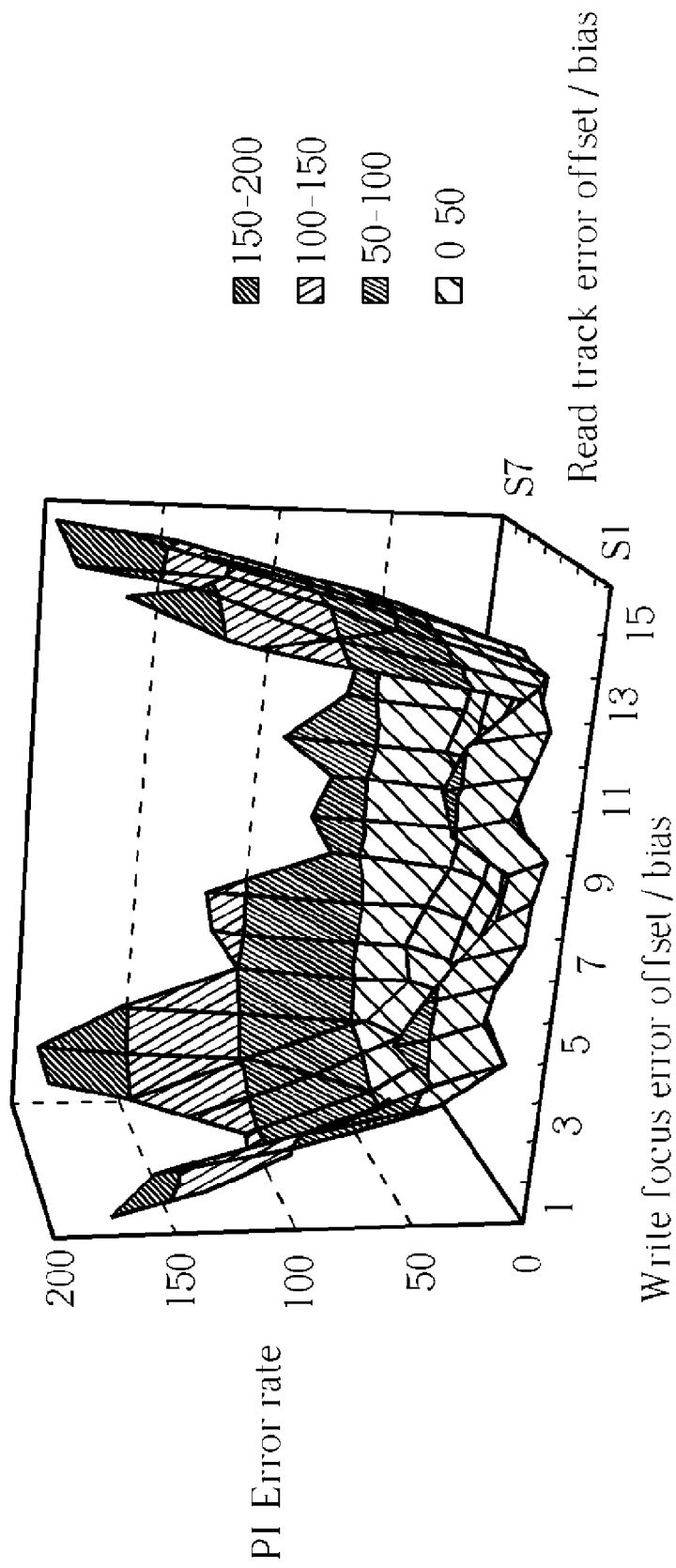
FIG. 6 is a 3D-graph illustrating the table shown in FIG. 5.

Please refer to FIG. 5, which is a table of a two-dimensional matrix 400 illustrating how to determine an optimal WFB and an optimal RFB according to a second embodiment of the present invention while running land tracks of an optical disc. Variables shown in FIG. 5 have corresponding definitions to the variables shown in FIG. 2 respectively, therefore, related operations and calculations applied on FIG. 2 are also the same with the abovementioned operations and calculations applied on FIG. 5, and are not described further. Please refer to FIG. 6, which is a 3-D graph illustrating a relationship between the WFB 403, RFB 401, and PI error rate 402 according to the table of FIG. 5.

The calibration method described above and illustrated in both FIG. 2 and FIG. 5 may also be applied for other variables, for example, the elements in the two-dimensional matrix 300 may be jitter values, beta values, or $M_{14}$ parameters. Note that when the elements in the two-dimensional matrix 300 are jitter values, a target jitter value should be the smallest one among a plurality of average jitter values. However, when the elements in the two-dimensional matrix 300 are $M_{14}$ parameters, a target $M_{14}$ parameter should be the largest one among a plurality of average $M_{14}$ parameters. If the elements in the two-dimensional matrix 300 are beta value, a target beta value is chosen to be the one closest to the beta value suggested by the optical disc manufacturer.

Figure 7:
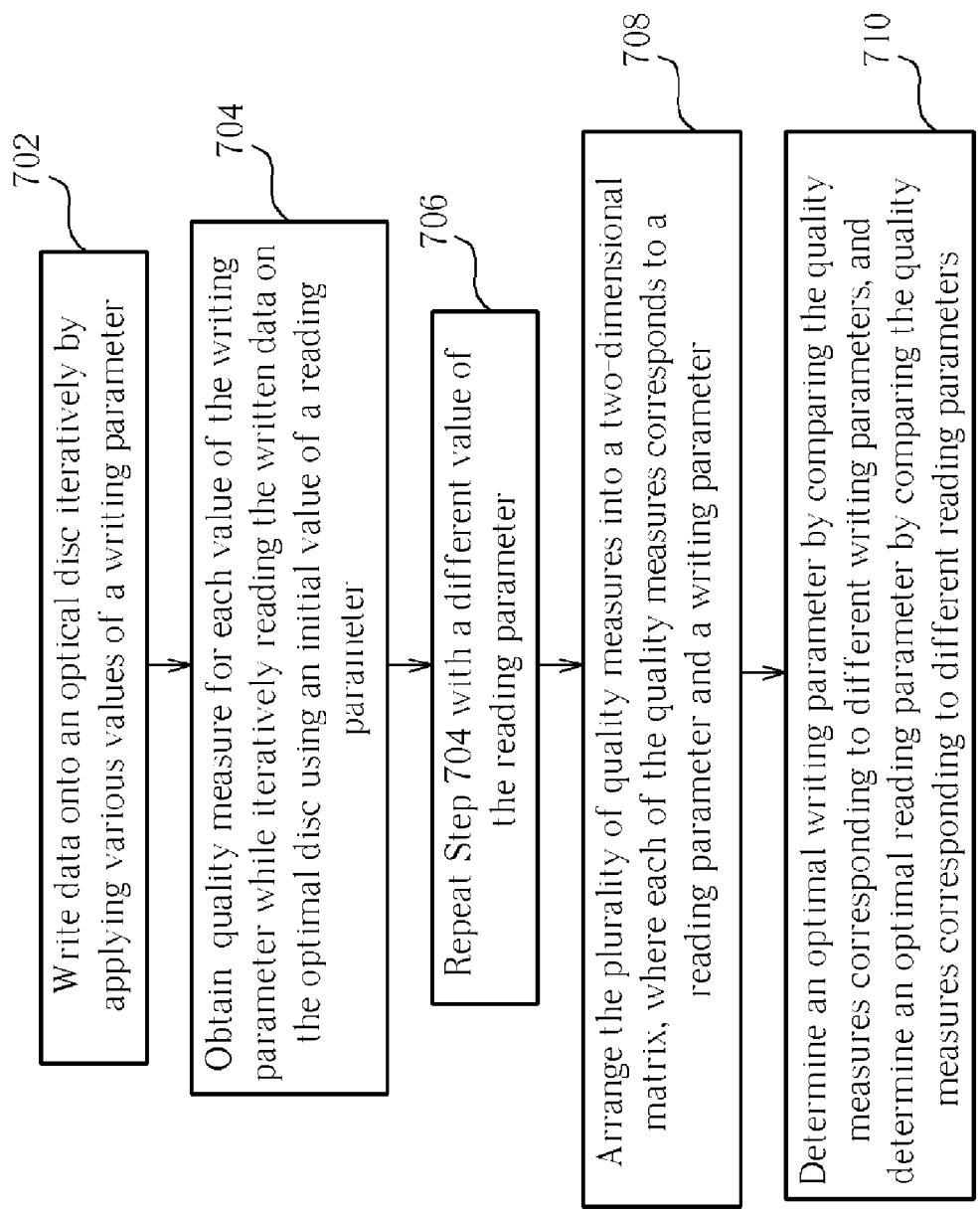
FIG. 7 is a flowchart showing a calibration method for determining servo parameters for reading and writing an optical disc.

Please refer to FIG. 7, which is a flowchart of a calibration method for determining servo parameters for reading and writing an optical disc. The calibration method of the present invention includes steps as follows:

Step 702: Write data onto an optical disc iteratively by applying various values of a writing parameter.
Step 704: Obtain a quality measure for each value of the writing parameter while iteratively reading the written data on the optimal disc using an initial value of a reading parameter.
Step 706: Repeat Step 704 with a different value of the reading parameter.
Step 708: Arrange the plurality of quality measures into a two-dimensional matrix, where each of the quality measures corresponds to a reading parameter and a writing parameter.
Step 710: Determine an optimal writing parameter by comparing the quality measures corresponding to different writing parameters, and determine an optimal reading parameter by comparing the quality measures corresponding to different reading parameters.

Figure 3:
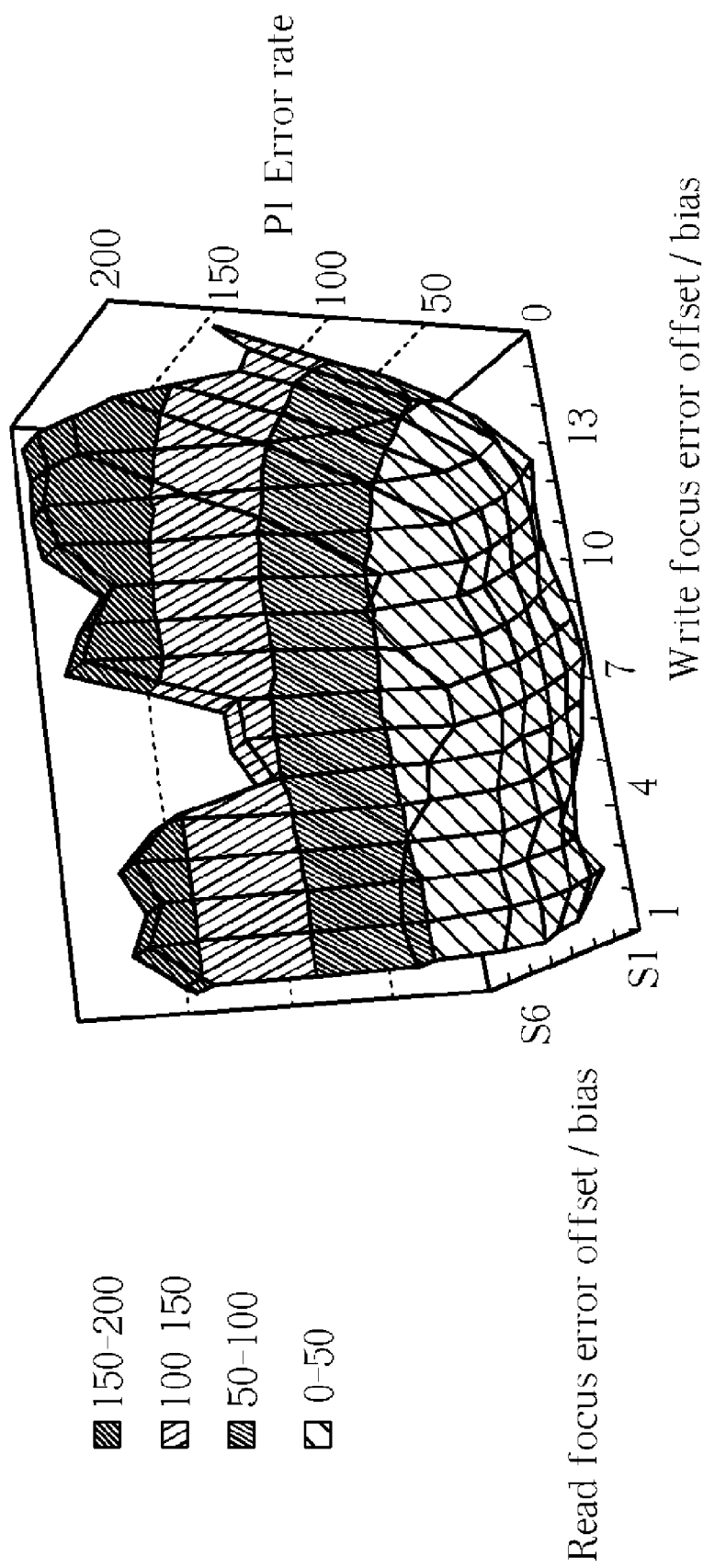
FIG. 3 is a 3D-graph illustrating the table shown in FIG. 2.
Figure 4:
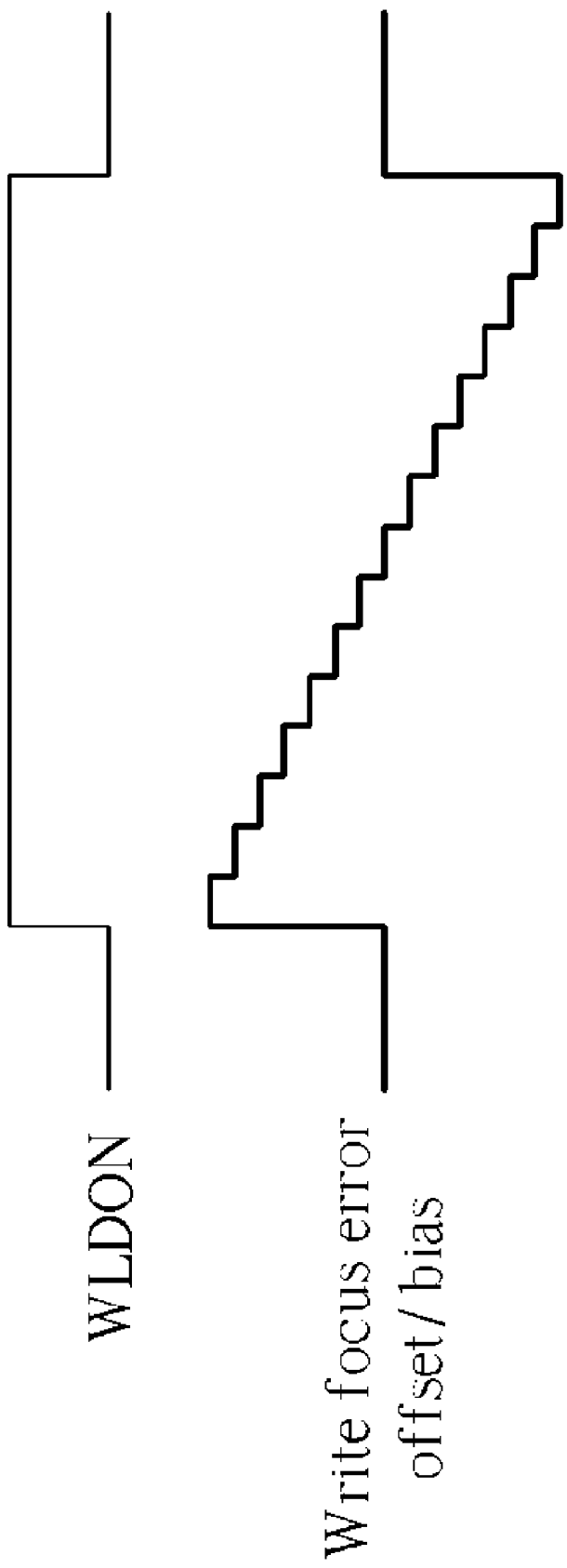
FIG. 4 is a plot illustrating how a write FE offset/bias shown in FIGS. 2 and 3 changes while writing an optical disc.

According to the embodiment shown in FIG. 3, the writing parameter is WFB 303, the reading parameter is RFB 301, and the quality measure is PI error rate 302.

In summary, a calibration method of determining servo parameters is provided in the present invention for solving the abovementioned issue of acquiring improper servo parameters especially when accessing a blank optical disc since no data can be read as references for determining servo parameters. By cross tests of write FE offset/bias and read FE offset/bias, or of write TE offset/bias and read TE offset/bias, a plurality of quality measures is generated with a decoder in the rewritable drive. The quality measures are served as a hard reference for determining optimal FE offset/bias or optimal TE offset/bias.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A calibration method for determining parameters for accessing an optical disc, the method comprising:
   generating a matrix having a plurality of elements, where each element of the matrix is a quality measure found by writing to the optical disc and reading from the optical disc, each row of said matrix utilizing a different writing parameter, each column of said matrix utilizing a different reading parameter;
   calculating a row candidate value for each row of said matrix according to the elements in said row respectively;
   calculating a column candidate value for each column of said matrix according to the elements in said column respectively;
   selecting one writing parameter by comparing the row candidate values as a target writing parameter; and
   selecting one reading parameter by comparing the column candidate values as a target reading parameter.

2. The method of claim 1 wherein selecting one writing parameter as a target writing parameter comprises picking the writing parameter corresponding to a smallest row candidate value; and selecting one reading parameter as a target reading parameter comprises picking the reading parameter corresponding to a smallest column candidate value.

3. The method of claim 2 wherein the quality measure is a PI error rate or a jitter value.

4. The method of claim 1 wherein selecting one writing parameter as a target writing parameter comprises picking the writing parameter corresponding to a greatest row candidate value; and selecting one reading parameter as a target reading parameter comprises picking the reading parameter corresponding to a greatest column candidate value.

5. The method of claim 4 wherein the quality parameter is a $M_{14}$ parameter.

6. The method of claim 1 wherein calculating a row candidate value for each row of said matrix comprises calculating an arithmetic mean, a geometric mean, or a median of the elements in the row as the row candidate value.

7. The method of claim 1 wherein calculating a column candidate value for each column of said matrix comprises calculating an arithmetic mean, a geometric mean, or a median of the elements in the column as the row candidate value.

8. A method of calibrating servo parameters for accessing an optical disc, the method comprising:
   changing the value of a writing parameter from a first writing parameter to a second writing parameter while writing data on the optical disc;
   reading the data from the optical disc with a first reading parameter;
   reading the data from the optical disc with a second reading parameter;
   acquiring a quality measure corresponding to each combination of the reading parameter and writing parameter;
   averaging the quality measures related to the first and second reading parameters respectively, and selecting an optimal reading parameter by comparing the averaged quality measures for accessing the optical disc based on the quality measures; and
   averaging the quality measures related to the first and second writing parameters respectively, and selecting an optimal writing parameter by comparing the averaged quality measures for accessing the optical disc based on the quality measures.

9. The method of claim 8 wherein the writing parameter is a write focus error (FE) offset/bias for focusing control or a write tracking error (TE) offset/bias for tracking control during writing of the optical disc, wherein the write FE offset indicates a focus location of a focus servo in writing, the write TE offset indicates a track location of a tracking servo in writing, the write FE bias indicates a bias added on a focus servo control force in writing, and the write TE bias indicates a bias added on a tracking servo control force in writing.

10. The method of claim 8 wherein the reading parameter is a read focus error (FE) offset/bias for focusing control or a read tracking error (TE) offset/bias for tracking control during reading of the optical disc, wherein the read FE offset indicates a focus location of a focus servo in reading, the read TE offset indicates a tracking location of a tracking servo in reading, the read FE bias indicates a bias added on a focus servo control force, and the read TE bias indicates a bias added on a tracking servo control force.

11. The method of claim 8 wherein the quality measure is a PI (inner parity) error rate, a jitter value, a beta value, or a $M_{14}$ parameter.

* * * * *